(No Model.)
J. U. BENDURE.
CIDER MILL AND PRESS.
No. 274,432. Patented Mar. 20, 1883.
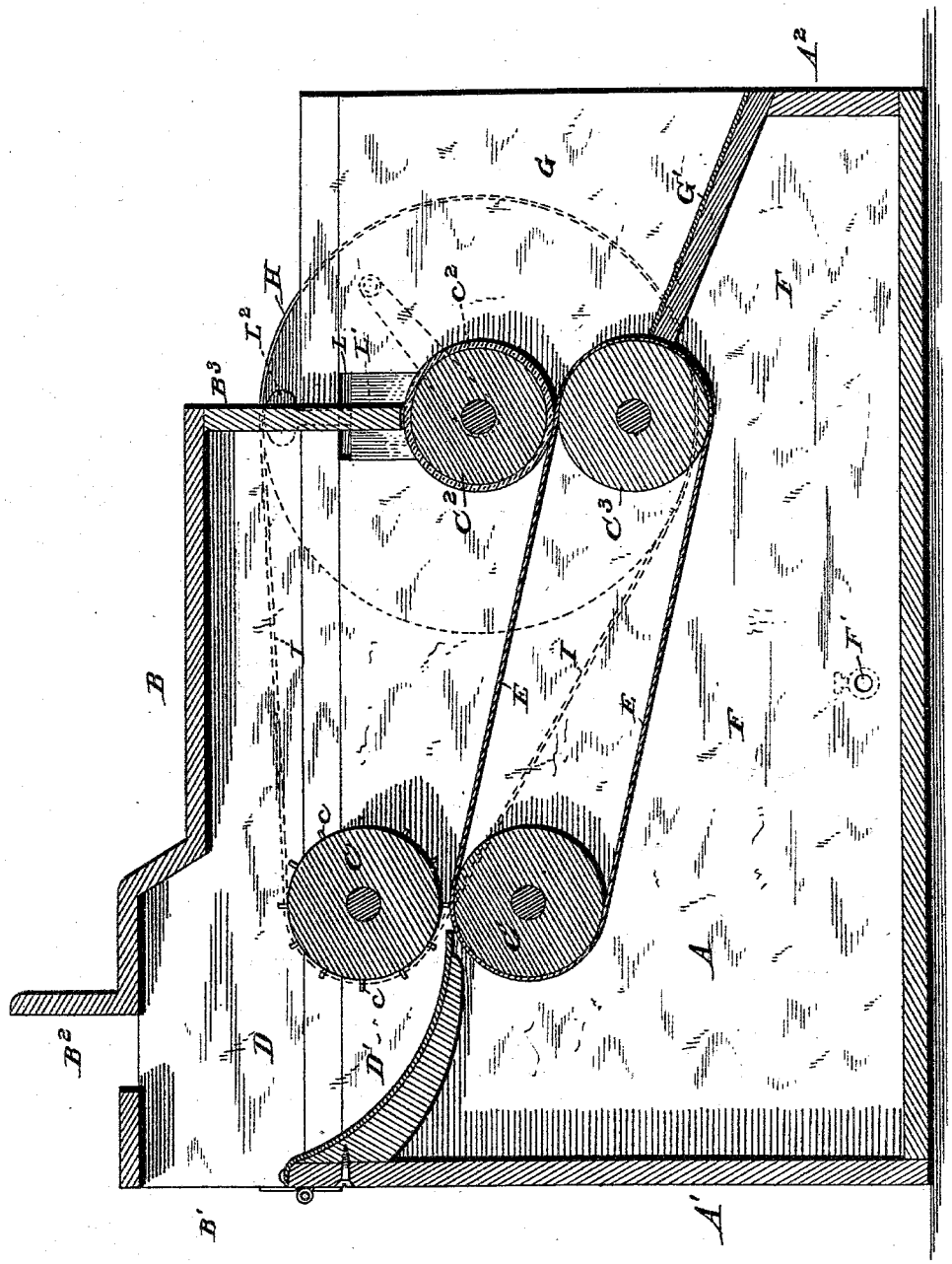

UNITED STATES PATENT OFFICE.

JOHN U. BENDURE, OF MIDDLEBOURNE, OHIO.

CIDER MILL AND PRESS.

SPECIFICATION forming part of Letters Patent No. 274,432, dated March 20, 1883.

Application filed August 28, 1882. (No model.)

*To all whom it may concern:*

Be it known that I, JOHN U. BENDURE, a citizen of the United States, residing at Middlebourne, in the county of Guernsey and State of Ohio, have invented certain new and useful Improvements in Cider Mills and Presses; and that I do hereby declare the following to be a full, clear, and exact description of the invention, such as will enable others skilled in the art to which it appertains to make and use the same.

My invention relates to cider mills and presses.

The nature of my invention consists of parts and combination of parts, all as will hereinafter be described.

Referring to the drawing, which represents a longitudinal view, in section, of my device, A represents the case; B, the cover; $C$ $C'$ $C^2$ $C^3$, the rollers; D, the hopper and grinding-chamber; E, the belt; F, the cider-receiving chamber; G, the passage for the waste product to escape from the press; H, the band-wheel, (shown in dotted lines,) and I a band connecting wheel H with a pulley in the shaft of roller C.

The case A may be of any size, and is provided with openings for the shafts of rollers C, $C'$, $C^2$, and $C^3$, which are arranged in pairs, as shown. The upper pair, C $C'$, is placed near the top and to the rear of the case, and may be connected together by means of suitable gearing. The upper roller, C, is provided with raised portions or teeth $c$ on its periphery, for catching the apples and assisting in crushing them between rollers C and $C'$. To the rear of these rollers is an inclined curved board, $D'$, fastened to the rear and side walls of case A, and projecting forward between rollers C $C'$. This board forms the bottom of the grinding-chamber and hopper and feeds the apples between rollers C and $C'$. Rollers $C^2$ and $C^3$ are placed one above the other, slightly below and forward of rollers C $C'$, and are connected by any suitable gearing. The shaft of the upper roller, $C^2$, is seated in slots in the walls of case A, and has the band-wheel H keyed to one end.

The slots L are provided with plumber-blocks $L'$, which rest upon the ends of the shaft to prevent them from slipping. The lower ends of screws $L^2$ rest upon the plumber-blocks $L'$ and hold them in place.

The roller $C^2$ may be made of any material; but I prefer to have a body of wood provided with a rubber or leather jacket.

A belt, E, made of canvas or any suitable straining material, is passed over rollers $C'$ $C^3$ to convey the crushed apples from rollers C $C'$ to $C^2$ $C^3$, to allow the juice to strain through and fall into the cider-receiving chamber F below the belt. This chamber is provided with any suitable means, at $F'$ or other point, for drawing off the cider. The crushed apples which are passed along the belt are again squeezed between rollers $C^2$ $C^3$ and fall in passage G, which is provided with an inclined bottom, $G'$, made preferably of some perforated substance, to allow the remaining juice to fall in the extension of chamber F. The upper end of the bottom $G'$ has slight contact with belt E to remove the particles of crushed apples that may adhere thereto, to prevent them from being carried into chamber F.

Cover B is hinged to the rear of the case, and arranged above the rollers C $C'$ and the belt, to prevent dust and other matters from mixing with the crushed apples. It is provided with openings $B'$ $B^2$, to permit of apples being dropped into chamber D and allow inspection of the chamber without removing the top. To the forward end of the cover is attached a pendent flange, $B^3$, which serves to protect the forward end of the chamber from dust. The lower end of this flange is in frictional contact with the top of roller $C^2$, and serves as a scraper.

The operation is as follows: Apples are put in chamber D and move down the inclined plane $D'$ to the rollers C $C'$, where they are caught by the projections on roller C and drawn in between the rollers and crushed, when the said rollers, which move in the direction of the arrows, are started by means of the band-wheel. The crushed apples are drawn across the space between rollers C, $C'$, $C^2$, and $C^3$ by means of belt E, through which the juice passes, and again squeezed between rollers $C^2$ $C^3$, which drop them upon floor $G'$ in passage G, from which they pass into a tub or other vessel at $A^2$. The matter adhering to the belt is removed by the edge of bottom $G'$, and that adhering to roller $C^2$ by flange $B^3$. The juice is drawn out of the chamber through opening $F'$.

What I claim as new is—

1. In a cider mill and press, the combination, with a cider-receiving chamber, of crusher-rollers $C$, $C'$, $C^2$, and $C^3$, arranged in pairs, as shown, of a belt passing around rollers $C'$ $C^3$, above the chamber, of a hopper having a curved bottom extending between rollers $C$ $C'$, and of an exit-passage having the upper end of its inclined bottom in contact with the belt, for the purpose set forth.

2. In a cider mill and press, the combination, with a cider-receiving chamber, of crusher-rollers $C$, $C'$, $C^2$, and $C^3$, arranged in pairs, as shown, of a belt passing around rollers $C'$ $C^3$, above the chamber, of a hopper having a curved bottom extending between rollers $C$ $C'$, of an exit-passage having the upper end of its inclined bottom in contact with the belt, and of a cover having a pendent flange in contact with rollers $C^2$, for the purpose set forth.

In testimony whereof I affix my signature in presence of two witnesses.

JOHN U. BENDURE.

Witnesses:
 JOSIAH P. BRYANT,
 JAMES K. STOCKDALE.